(12) United States Patent
Gonzalez et al.

(10) Patent No.: US 7,895,415 B2
(45) Date of Patent: Feb. 22, 2011

(54) CACHE SHARING BASED THREAD CONTROL

(75) Inventors: Antonio Gonzalez, Barcelona (ES); Josep M. Codina, Hospitalet de Llobregat (ES); Pedro Lopez, Molins de Rei (ES); Fernando Latorre, Huesca (ES); Jose-Alejandro Pineiro, Barcelona (ES); Enric Gibert, Sant Cugat del Vallès (ES); Jaume Abella, Barcelona (ES); Jaideep Moses, Portland, OR (US); Donald Newell, Portland, OR (US); Ravishankar Iyer, Portland, OR (US); Ramesh G. Illikkal, Portland, OR (US); Srihari Makineni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1044 days.

(21) Appl. No.: 11/705,987

(22) Filed: Feb. 14, 2007

(65) Prior Publication Data

US 2008/0195849 A1   Aug. 14, 2008

(51) Int. Cl.
*G06F 7/38* (2006.01)
*G06F 9/00* (2006.01)
*G06F 9/44* (2006.01)
*G06F 15/00* (2006.01)

(52) U.S. Cl. .................................. 712/220

(58) Field of Classification Search .............. 712/220
See application file for complete search history.

(56) References Cited

PUBLICATIONS

Suh et. al; A New Memory Monitoring Scheme for Memory-Aware Scheduling and Partitioning; 2002; IEEE.*
Suh et al.; Dynamic Cache Partioning for Simultaneous Multithreading Systems; 2001; CSAIL.*
Kim et al.; Fair Cache Sharing and Partioning in a Chip Multiprocessor Architecture; 2004; PACT.*
Settle et al.; A Dynamically Reconfigurable Cache for Multithreaded Processors; Apr. 2006.*

* cited by examiner

*Primary Examiner*—Eddie P Chan
*Assistant Examiner*—Corey Faherty
(74) *Attorney, Agent, or Firm*—Trop, Pruner & Hu, P.C.

(57) ABSTRACT

Apparatus and computing systems associated with cache sharing based thread control are described. One embodiment includes a memory to store a thread control instruction and a processor to execute the thread control instruction. The processor is coupled to the memory. The processor includes a first unit to dynamically determine a cache sharing behavior between threads in a multi-threaded computing system and a second unit to dynamically control the composition of a set of threads in the multi-threaded computing system. The composition of the set of threads is based, at least in part, on thread affinity as exhibited by cache-sharing behavior. The thread control instruction controls the operation of the first unit and the second unit.

6 Claims, 4 Drawing Sheets

CACHE SHARING BASED THREAD CONTROL

TECHNICAL FIELD

Embodiments of the invention relate to the field of microprocessors and computer systems. More particularly, at least one embodiment of the invention relates to an apparatus for controlling thread mixtures in a multi-threaded system based on cache sharing behavior.

BACKGROUND

In computer systems, a gap between central processing unit (CPU) speed and memory latency makes processor performance dependent on management of memory subsystems, particularly when multiple threads can execute simultaneously in a system, (e.g., simultaneous multithreading system (SMT), chip level multithreading system (CMP)). These systems mandate decisions about providing private cache resources (e.g., static partitions) to each thread or allowing threads to share a cache. However, private caches are prone to internal fragmentation and thus cache sharing is an alternative that commonly provides better performance.

In a shared cache, lines from one thread may be evicted by a fill initiated by a different thread. If the replaced cache line was not intended to be replaced by the first thread before its next reuse, this thread will suffer a cache miss for an access that would have been a cache hit if the thread was executing alone. Depending on the frequency of this type of event the system may suffer from suboptimal performance. Additionally, fairness between threads could be affected, resulting in thread starvation, priority inversion, and so on. These issues may continue while operating system (OS) and platform architectures schedule threads irrespective of thread sharing behavior and thread affinity.

BRIEF DESCRIPTION OF THE DRAWINGS

The accompanying drawings, which are incorporated in and constitute a part of the specification, illustrate various system embodiments, method embodiments, and other embodiments of various aspects of the invention. It will be appreciated that the illustrated element boundaries (e.g., boxes, groups of boxes, or other shapes) in the figures represent one example of the boundaries.

DETAILED DESCRIPTION

One embodiment of the invention provides a way to characterize sharing behavior of threads during run-time and to schedule threads based on observed sharing behavior. The embodiment facilitates characterizing sharing behavior among execution threads so that threads having a high degree of sharing are scheduled to execute together to take advantage of a platform topology that supports cache sharing. These embodiments address issues associated with conventional scheduling that ignores both sharing behavior and overall platform topology.

Figure 1:
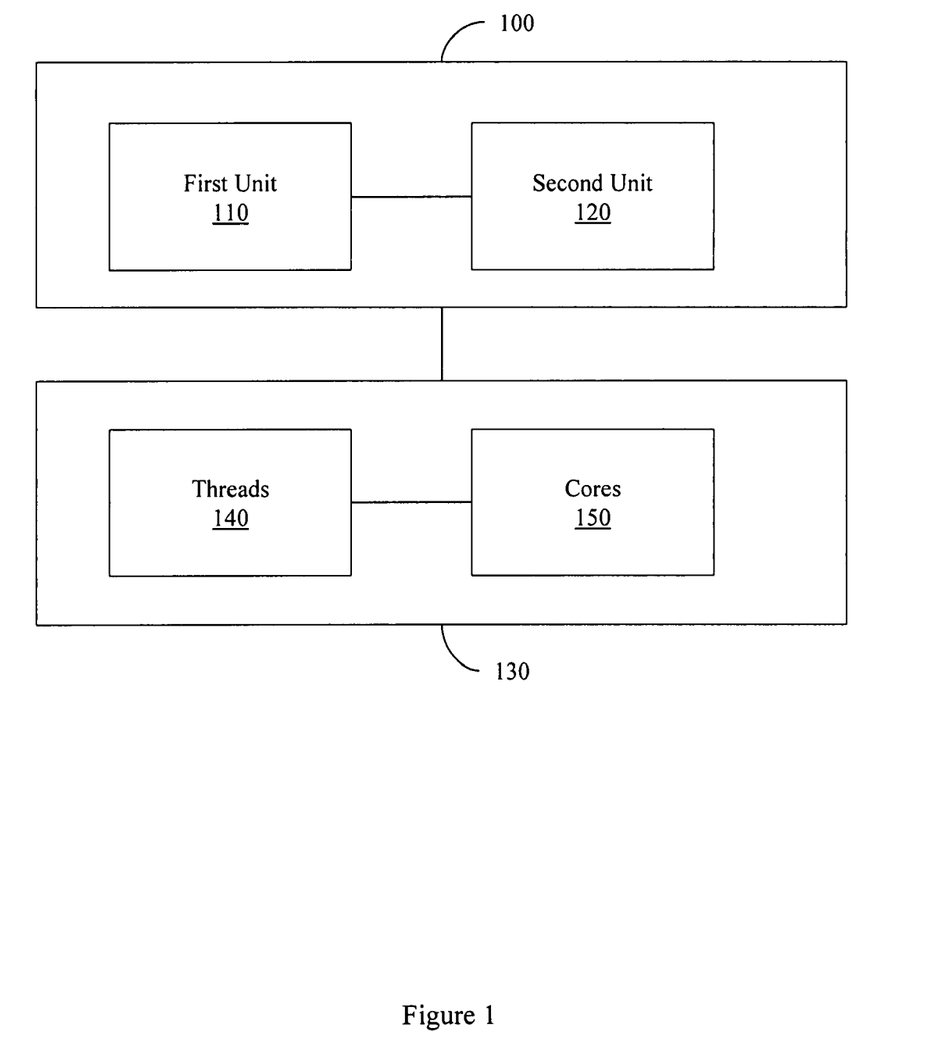
FIG. 1 is a block diagram illustrating an organization of processing logic in which at least some aspects of at least one embodiment of the invention may be performed.

FIG. 1 illustrates an organization of processing logic to characterize sharing behavior of threads during run-time and to schedule threads based on observed sharing behavior. The processing logic may be organized into an apparatus 100. Apparatus 100 may include a first unit 110 to dynamically determine a cache sharing behavior between threads 140 in a multi-threaded computing system 130. The multi-threaded computing system 130 may include multiple cores 150. The apparatus 100 may also include a second unit 120 to dynamically control the composition of a set of threads in the multi-threaded computing system 130. The control may be based, at least in part, on how threads 140 share resources (e.g., cache memory). In one example, apparatus 100 may determine how space is allocated to threads and certain threads may be allocated their own exclusive areas to mitigate the effects of interactions with other threads. Apparatus 100 may include logic that operates at the operating system level and may include logic that operates at the hardware level. These logics may work together in apparatus 100, although neither is dependent on a specific instance of the other.

Figure 2:
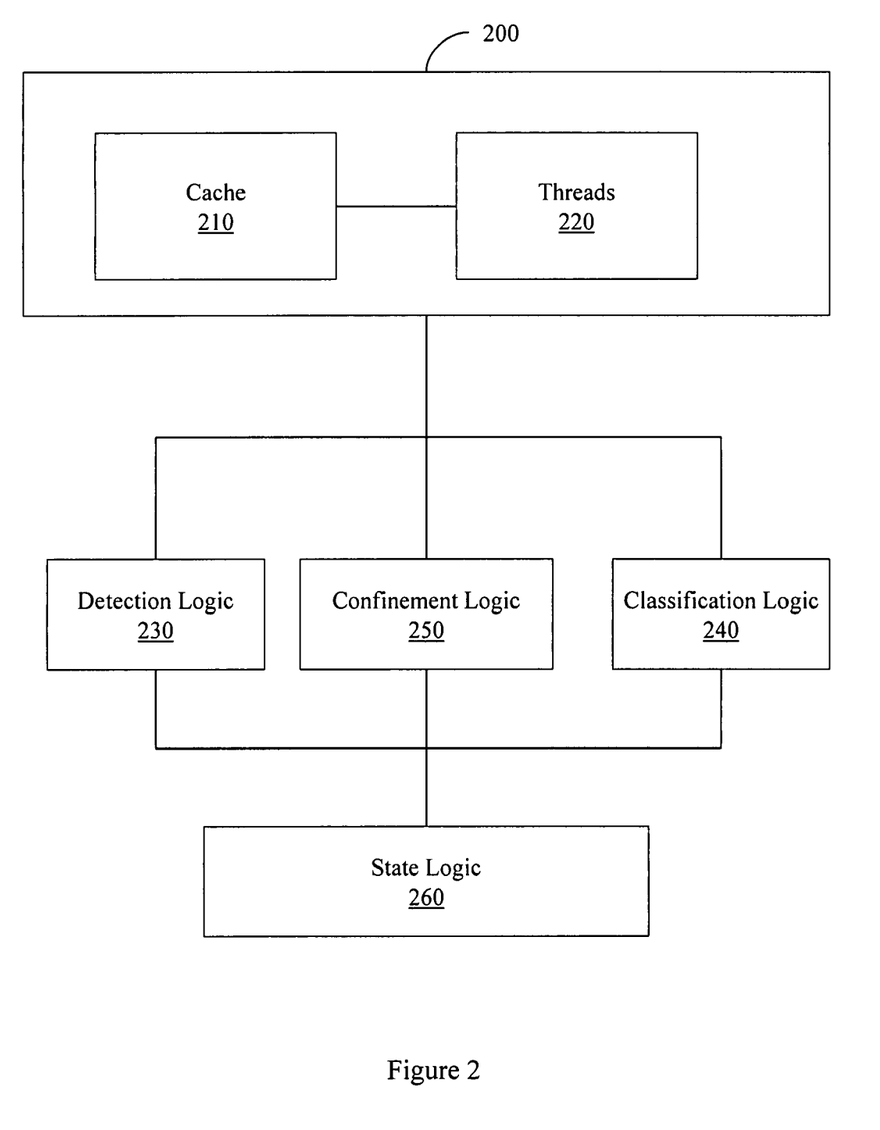
FIG. 2 is a block diagram illustrating an organization of processing logic in which at least some aspects of at least one embodiment of the invention may be performed.

FIG. 2 illustrates one embodiment of an organization of processing logic in which at least some aspects of at least one embodiment of the invention may be performed. In this embodiment, processing associated with the first unit 110 (FIG. 1) may be performed by a detection logic 230 and a classification logic 240. Similarly, processing associated with the second unit 120 (FIG. 1) may be performed by a confinement logic 250 and a state logic 260. The state logic 260 may store data corresponding to a state in a finite state machine (FSM) that controls, at least in part, both first unit 110 and second unit 120. State logic 260 may be associated with detection, classification, and confinement and thus, state logic 260 may control, at least in part, the behavior of logics 230, 240, and 250. Thus, while state logic 260 appears by itself, in one example it may be part of both the first unit 110 and the second unit 120. The state logic 260 may operate as a controller that handles the detection step, determines whether a transition to a stable state or classification state should occur, handles a multi-pass classification state, and so on. Thus, the state logic 260 and a related FSM operate as a cache partition controller. Transitions and states are determined by the cache partition controller.

The detection logic 230 may detect an inter-thread cache conflict condition between threads 220 in a multi-threaded computing system 200. The cache conflict may arise when threads 220 share a cache 210. Apparatus 100 may be viewed as a mechanism to dynamically detect and mitigate suboptimal performance due to inter-thread cache conflicts in a cache memory shared by multiple threads. Detection logic 230 may use performance monitors including, for example, per-thread cache accesses, cache hits, cache misses, and so on in a three-step approach to detect and mitigate suboptimal performance. In one example, processing includes suboptimal performance detection performed by detection logic 230, dynamic thread classification performed by classification logic 240, and confinement of threads performed by confinement logic 250, which identifies threads behaving as bad citizens due to their ineffective and harmful use of cache space.

The classification logic 240 may classify a thread as a quiet thread or a non-quiet thread. Among non-quiet threads, a thread may be classified as a victim thread, a hybrid thread, or a bully thread. The classification may be based on thread-tothread affinity as determined by relative interdependent cache miss rates. In one example, the classification logic 240 may classify a thread based on miss rate changes associated with cache partition decisions. Analyzing miss rate changes indirectly determines a vulnerability attribute and a destructiveness attribute. The vulnerability attribute concerns the likelihood of a thread experiencing cache misses when sharing the cache 210 with other threads that the thread would not have experienced if not sharing the cache 210. The destructiveness attribute concerns the ability of a thread to evict lines from the cache 210, which may potentially cause other threads sharing cache 210 to experience additional misses.

Theoretical thread vulnerability can be determined using stack distance profiles (SDP) and can be quantified as the percentage of cache hits to a line not in the most-recently-used (MRU) way of its set. Cache accesses update replacement information, enforce the presence of a line in the cache, and prevent it from being pushed closer to the least-recently-used (LRU) ways by fetches from another thread. Therefore, high hit rates in the lower MRU positions (MRU, MRU+1, etc.) can be interpreted as a thread's ability to protect its own lines against eviction by other threads. Vulnerable programs are those with high hit rates in lines not in the higher MRU positions (hits in LRU, LRU-1, etc.), corresponding to those programs fitting in cache but making use of a significant portion of the cache. It is to be appreciated that vulnerability is not measured directly, but rather is a behavior that can be observed about threads. Vulnerability may be indirectly measured and/or analyzed using miss rate changes and/or miss count changes that occur while different cache partition configurations exist. Information concerning theoretical vulnerability (described above) and theoretical destructiveness (defined below) guide interpretations of miss rate and/or miss count changes which in turn guide classification of thread behavior.

Theoretical thread destructiveness can be defined as the ability of a thread to evict lines from the cache and can be quantified using the cache miss rate or number of cache misses per fixed number of instructions. A thread with a high miss rate causes new blocks to be brought into the cache. These new blocks evict resident lines, which in a multi-threading (MT) context can be lines associated with other threads. Conversely, if a thread has a low miss rate, the thread will not cause extra misses to other threads sharing the same cache memory. The depth of penetration of a thread into the SDP of other threads is proportional to its own miss rate; that is, the higher the miss rate, the closer to MRU position in the SDP of the other thread (starting at LRU) will cache hits become misses due to inter-thread conflicts. Threads with a flat SDP are more vulnerable than those with a sharp SDP.

In one embodiment, a quiet thread is a non-vulnerable, non-destructive thread that is unlikely to experience cache misses due to inter-thread conflicts. In one embodiment a victim thread is a vulnerable, non-destructive thread that is likely to experience cache misses due to inter-thread conflicts. In one embodiment, a bully thread is a non-vulnerable, destructive thread that is likely to cause cache misses in other threads. In one embodiment, a hybrid thread is a vulnerable, destructive thread that may behave as a victim or a bully thread, depending on the type of threads with which it shares a cache.

The specific behavior of a thread as bully, hybrid, victim, or quiet, may not be intrinsic to a thread itself but rather may be a combination of thread characteristics (e.g., working set size, cache access patterns) and cache configuration (e.g., number of sets, associativity, mapping of addresses to sets). The working set of a bully thread by definition does not fit in cache, while the working set of a quiet thread is likely to fit well in a small fraction (e.g., a single way) of a cache, and the working set of a victim thread is likely to fit but to occupy a significant fraction of the cache space. From one point of view, a victim thread exhibits a metastable behavior between quiet thread behavior and bully thread behavior. Bully threads and quiet threads can share a cache without suffering extra misses. Thus, detecting thread affinity problems in a cache in a multi-threaded computing system 200 amounts to detecting the presence of victim or hybrid threads. If there are no vulnerable (e.g., victim, hybrid) threads in the thread mix, there is low potential for performance improvement since threads are behaving as if each of them was executing using a private cache having the same size as shared cache 210.

The confinement logic 250 may selectively limit availability of space in cache 210 in the multi-threaded system 200 to a bully thread to mitigate issues associated with thread affinity. The confinement logic 250 may allow quiet applications, victim applications, or hybrid applications behaving as victim applications to use all cache ways. However, a bully thread is not making efficient use of cache resources since it may be evicting useful cache lines of vulnerable (e.g., victim, hybrid) applications. The operation of confinement logic 250 does not depend on any specific cache partitioning scheme or any specific replacement policy (e.g., LRU).

The confinement logic 250 may determine a desired (e.g., optimal) number of ways that a bully thread requires. Example numbers of ways include one way for pure bullies and up to four ways for hybrid threads behaving as bullies). Bully confinement can be performed in different ways. One approach includes initially providing the bully thread with a single way, comparing its miss rate (MR) with the MR it had in the initial state, and if it is less or equal, allocating the single way. If the MR is higher by, for example, a miss rate difference threshold, the approach may include progressively increasing the number of ways to a greater number (e.g., 2, 3, 4) until the MR changes by less than the threshold amount. After identifying a desirable number of ways to allocate, and allocating that number of ways, the bully may be considered to be stabilized.

The state logic 260 may store data corresponding to a state in a finite state machine (FSM) that controls, at least in part, processing associated with thread control. The state logic 260 may also control transitions between states in the FSM based on the cache sharing behavior between threads. In one embodiment the classification logic 240 may classify a thread based on a cache miss rate change associated with the thread while the FSM is in the second state and different cache partition decisions are applied to the thread mix sharing the cache. The cache partition decisions may involve using different masks involved in cache line replacement for the threads. It is to be appreciated that the FSM may be embodied in different forms including hardware, machine executable instructions, a thread, a portion of an operating system, and so on.

In one example, state logic 260 may allow execution to proceed in a stable state until a re-characterizing change in the thread mix is detected. The change may be due, for example, to a phase change in threads, to a context switch, to detecting a different mix of threads sharing the cache resources, and so on. When the re-characterizing change is detected, the FSM transitions to the all-sharing initial state. In another example, state logic 260 may allow execution to proceed in the stable state until a maximum number of cycles passes, after which the FSM transitions back to initial state.

Figure 3:
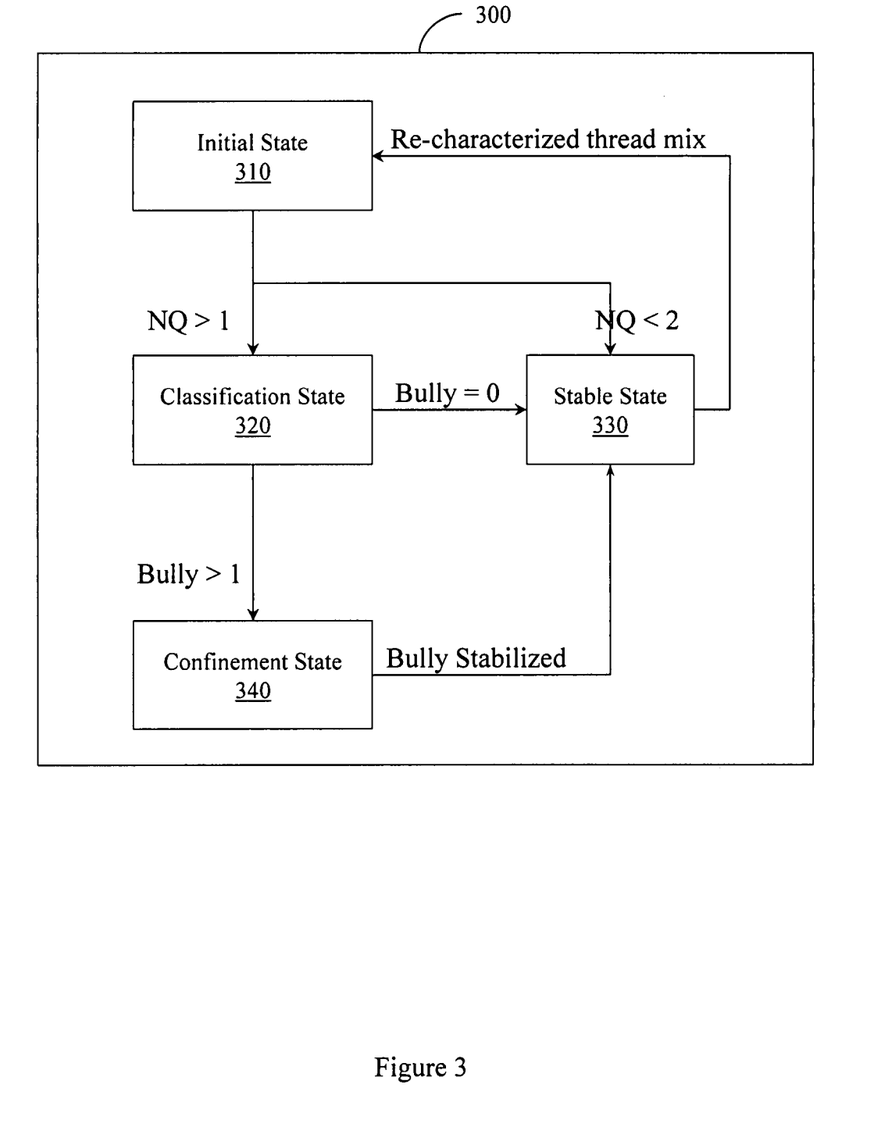
FIG. 3 is a block diagram illustrating a finite state machine associated with at least some aspects of at least one embodiment of the invention.

FIG. 3 is a block diagram illustrating an FSM 300 associated with at least some aspects of at least one embodiment of the invention. As described above, the FSM 300 may be embodied in different forms including hardware, software, a thread, a portion of an operating system, and so on. In one embodiment, the FSM 300 may have four states. The four states may include, for example, an initial state 310 where threads are run for a warmup period, where miss rate counters are then reset, where threads are run for a sample period, and where threads are classified with miss rates generated during the sample period. The four states may also include, for example, a classification state 320 where accesses from non-quiet threads are isolated, where exclusive way partitioning among non-quiet threads is performed, where threads are run for a test period, and where threads are then classified based on a change in miss rate. The four states may also include, for example, a confinement state 340 where cache space availability is limited for a bully thread, where a number of ways to allocate to a bully thread is determined, and where the number of ways is allocated to the bully thread to stabilize such thread. The four states may also include, for example, a stable state 330 that will be held until a pre-determined number of cycles are executed in the multi-threaded computing system, there is a change in the composition of the set of threads, and/or there is a change in their behavior (e.g., a phase change).

The state logic 260 (FIG. 2) may control transitions in the FSM 300. A transition from the initial state 310 to the classification state 320 may occur upon identifying at least two non-quiet threads in a set of threads running on a multi-threaded computing system. A transition from the initial state 310 to the stable state 330 may occur upon identifying less than two non-quiet threads in the set of threads. A transition from the classification state 320 to the confinement state 340 may occur upon identifying a bully thread. A transition from the classification state 320 to the stable state may occur upon detecting that there are no bully threads in the thread mix. A transition from the confinement state 340 to the stable state 330 may occur upon stabilizing a bully thread. A transition from the stable state 330 to the initial state 310 may occur upon identifying a change in the composition of a set of threads, and/or upon completion of a pre-determined number of cycles.

An apparatus (e.g., microprocessor, multi-threaded computing system) may be configured with hardware to support the processing of apparatus 100. For example, hardware may be added to support processing associated with FSM 300. In one embodiment, additional hardware may relate to the initial state 310 and thus may include a register to store a miss rate or miss count generated while the FSM 300 is in the initial state 310, a data store to store data corresponding to an indicator that identifies whether a thread is a quiet thread, and a register to store data corresponding to a miss rate threshold or miss count threshold against which a miss rate or miss count can be compared to determine whether a thread is a quiet thread. In some examples, "miss metric" may be used to refer to statistics including the miss rate and the miss count. Additional hardware may relate to classification state 320 and thus may include a register to store data corresponding to the miss rates or miss counts generated while the FSM 300 is in the different stages (e.g., corresponding to different cache partitions) of classification state 320, a data store to store data corresponding to an indicator that identifies a thread as a bully thread, and a register to store data corresponding to a threshold of miss rate change or miss count change against which a change in miss rate or miss count can be compared to determine whether a thread having such change in miss rate or miss count is behaving as a victim thread. Additional hardware may relate to confinement state 340 and thus may include a register to store data corresponding to a miss rate or miss count generated while the FSM 300 is in the confinement state 340, a data store to store data corresponding to an indicator that identifies whether a thread has been stabilized while the FSM 300 is in the confinement state 340, and a register to store data corresponding to a confinement difference threshold against which a miss rate or miss count can be compared to determine whether a bully thread has been stabilized.

In one embodiment, cache partitioning may be employed. In this example, hardware to support the four-state FSM 300 and to store miss rate information, miss count information, and configuration parameters is added to a conventional system. The miss rate information, miss count information, and configuration parameters may be stored, for example, in registers. Additional processing is only performed when suboptimal performance is detected and threads otherwise share the cache in the same manner as if the system were not in place. That is, when the zero-overhead detection step finds no reason to modify the default all-sharing behaviour, the FSM goes directly into a stable state.

In one example, an FSM uses information gathered by performance monitors (e.g., number of per-thread cache accesses, hits and misses), and stores partial miss rates or miss counts at the end of FSM monitoring intervals to guide classification and partitioning steps.

In one example, the initial state corresponds to having all threads sharing all cache ways, which is the baseline cache configuration. In this state, the LRU way masks are bit-vectors of ones for each thread. After executing a thread mix under this configuration for an initial (e.g., warmup) period, in which cold cache misses occur, the performance monitors are reset. Performance information is then collected during a subsequent (e.g., sample) period of memory accesses. Based on the collected performance information threads are classified into quiets and non-quiets. Miss rates or miss counts may be compared to a threshold value and threads with a miss rate or miss count lower than the threshold may be classified as quiet threads while threads with a miss rate or miss count above the threshold may be classified as non-quiet threads. If the number of non-quiet threads is less than two, suboptimal performance is not occurring since it takes at least one vulnerable (e.g., victim, hybrid behaving as victim) and one non-quiet thread (victim, hybrid behaving as bully, bully) to have inter-thread conflicts. In this case, the FSM may transition to a stable state. If there is more than one non-quiet thread, the FSM may transition to a classification state to determine which threads are being victimized and which ones are behaving as bullies in the thread mix.

The classification state is reached when two or more non-quiet (NQ) threads are identified in the initial state. Only NQ threads can be affected by inter-thread conflicts. Therefore quiet threads may continue executing with their default LRU way masks while processing associated with the classification state step distinguishes NQ threads into threads behaving as victims and threads behaving as bullies.

To perform victim/bully behavior classification, accesses from NQ threads to the cache are isolated by manipulating their LRU masks and by performing exclusive way partitioning among them. After this manipulation, the resulting miss rates or miss counts obtained using different partition masks within the classification state are compared between themselves and with those previously obtained during the initial state to classify threads as victims or bullies. Threads behaving as victims are those threads with a reduction on their miss rate or miss count that exceeds a reduction threshold when running with the majority of cache ways available and without cache interference. Threads behaving as bullies are those threads whose miss rate or miss count is similar in all cases (e.g., initial all-sharing state, running with the majority of cache ways available without interference, and running with a few cache ways available). This occurs because most cache accesses are hits to the MRU way or MRU closest ways. While LRU masks and an LRU policy are described, it is to be appreciated that miss rates and classifications may not depend on any specific replacement policy (e.g., LRU).

Consider the following example. Assume a 4T thread mix that may have up to 4NQ threads, which would require a four-pass approach. Assume the following configurations of number of cache ways allocated to each thread: a) 5-1-1-1, b) 1-5-1-1, c) 1-1-5-1, and d) 1-1-1-5. Each pass facilitates extracting miss or miss count information corresponding to running with majority of the cache ways available and without thread interference (e.g., five cache ways available for private use), and corresponding to running with a single cache way available for private use. These miss rates (MR) or miss counts (MC) can be compared to each other and with the MR or MC in the initial state for each thread to perform thread classification. Having at least one way exclusively available for each thread in each pass avoids significant performance drops with respect to the baseline, and results in better multi-threaded performance than techniques that rely on suspending execution of any particular thread. With 3NQ threads, only three passes would be necessary, with configurations: a) 6-1-1, b) 1-6-1, and c) 1-1-6. With only 2NQ threads, a two-pass classification: a) 7-1, b) 1-7, or an enhancement consisting of a single-pass classification using a 4-4 configuration, would be possible. This optimization could be the default approach when analyzing 2T thread mixes, since it allows comparing at the same time the miss rates of both 2NQ threads to their MRs in the initial state.

A miss rate change or miss count change threshold value may be available for comparison purposes. If a change in the MR/MC of a NQ thread having most of the cache available with respect to that corresponding to having a single way is lower than the threshold value, then the thread is classified as a bully. If the MR/MC change is higher than the threshold value then the NQ thread is behaving as a victim. The LRU way mask for victims is restored to their default value where all ways are accessible. When the classification process has finished, a transition to either stable or bully confinement states may occur. If there is a bully in the thread mix, the FSM transitions to a confinement state. If no bully threads are detected, the FSM transitions to a stable state.

In one example, parameters associated with the processing performed in the different states can be stored and/or manipulated. For example, the duration of the warm-up period, the duration of the detection sample period, the duration of the classification pass period, the duration of the confinement pass period, the granularity of a phase period, and so on may be manipulated. In one example, these values may be manipulated through a graphical user interface. Additionally, thresholds concerning detecting a quiet thread, detecting a bully thread, detecting whether a bully has been stabilized, and so on, may also be stored and/or manipulated.

Figure 4:
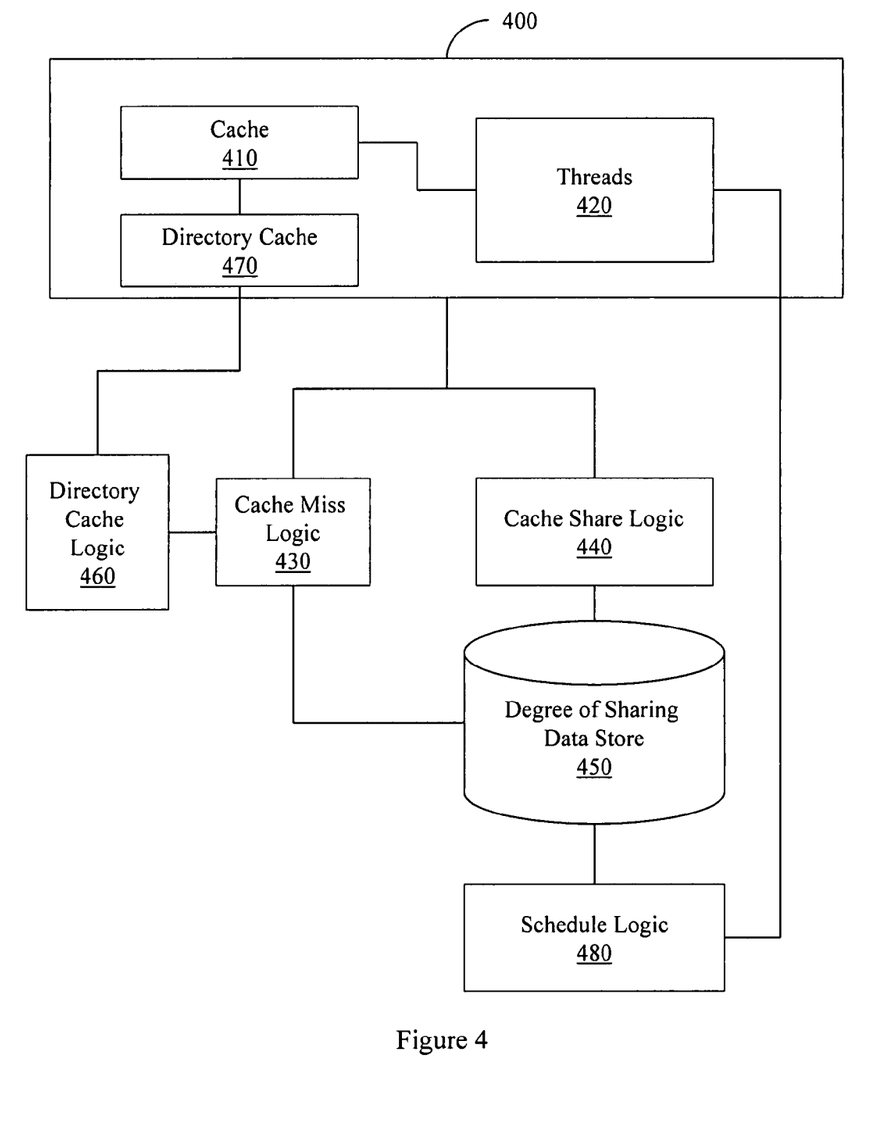
FIG. 4 is a block diagram illustrating an organization of processing logic in which at least some aspects of at least one embodiment of the invention may be performed.

FIG. 4 is a block diagram illustrating an organization of processing logic in which at least some aspects of at least one embodiment of the invention may be performed. Consider a platform 400 running an SMP OS. When applications are launched, threads 420 or processes are created and are scheduled to various cores/threads with the objective of maximizing different parameters. These cores/threads 420 may interact with a cache 410. Some parameters that may be considered are throughput, response times, resource utilization, avoiding indefinite postponement, ensuring predictability, and so on. Typically schedulers do not consider the sharing behavior of threads with respect to cache 410. This may lead to the interaction of bully threads, victim threads, and so on, as described above. Similarly, schedulers may not consider the overall platform 400 topology (e.g., cache sharing between cores). This may result in scheduling threads 420 with no affinity (e.g., no data sharing actions) to cores that share the same cache 410. These unwisely scheduled threads may then interfere destructively rather than constructively as might threads having a greater degree of sharing.

Processing associated with first unit 110 (FIG. 1) and second unit 120 (FIG. 1) facilitates providing knowledge about thread affinity (e.g., cache sharing behavior) and the underlying platform topology (e.g., cache sharing cores). This processing also facilitates scheduling threads based on this knowledge. Thus, the processing may produce higher cache hit-rates than would be achieved when scheduling occurs without considering this information.

In one embodiment, processing associated with first unit 110 may be performed by a cache miss logic 430 that detects a cache miss for a first thread associated with a core in a multi-core system 400. Processing may also be performed by a directory cache logic 460 that accesses a directory cache 470 associated with the multi-core system 400. The directory cache logic 460 may update an entry in the directory cache 470 to record a relationship between a core in the multi-core system 400, a thread 420 in the multi-core system 400, and a cache line in a cache 410 in the multi-core system 420. While directory cache logic 460 is described as updating an entry in the directory cache 470, it is to be appreciated that directory cache logic 460 may update data related to an entry in the directory cache 470.

Consider a CMP system with 16 cores, 1 thread per core, 4 mid-level caches (MLC), a shared lower-level cache (LLC) and a directory cache. The directory cache 470 stores information concerning cache lines and the state of the lines in lower level caches. A conventional directory entry may not include a thread identifier. Thus, a thread identifier may be added to a directory entry to track the thread id (tid). The tid for a hardware thread should track the tid of a hardware thread that last touched a line causing the state to change. While adding a tid to a directory entry is described, it is to be appreciated that a tid may be stored elsewhere and related to a directory entry.

With the tid available, a degree of sharing data store 450 (e.g., degree of sharing matrix (DSM)) may be manipulated. The degree of sharing data store 450 may store relationship values corresponding to a degree of sharing that exists between threads in the system. The DSM may rely on data stored, for example, in a set (e.g., array) of counters that store data corresponding to cache misses. In one example, a DSM may be implemented as a small area of memory close to the L3, and may even be implemented as SRAM. Logic for indexing, incrementing, decrementing, and resetting entries in the DSM may be provided. This logic may be provided, for example, in hardware, software, firmware, and/or combinations thereof. Thus, the DSM may store information concerning hardware threads and may expose this information to an operating system or scheduler concerned with software threads.

Processing may also be performed by a cache share logic 440 that accesses a degree of sharing data store 450 and updates the degree of sharing data store 450 to indicate a relationship between a first thread and a second thread in the multi-core system 400. The relationship between the threads may be based on the first thread and the second thread both accessing the same cache line in cache 410 in the multi-core system 400.

In one embodiment processing associated with second unit 120 may be performed by a schedule logic 480 that accesses the degree of sharing data store 450 and that selects a set of threads to schedule for execution together in a core in the multi-core system 400. The selection may be based, for example, on data in the degree of sharing data store 450 that relates members of the set of threads. The data may indicate, for example, that threads scheduled for execution together have a cache line sharing affinity that exceeds a threshold.

Assume a core (e.g., core4) encounters a miss in its MLC (mid-level cache) (e.g., MLC1). Upon a directory lookup, an MLC1 slot may be updated in the directory (e.g., directory cache 470) to reflect that core4 accessed the line. The directory entry may also indicate that the line is shared by other MLCs (e.g., mlc0, mlc2) and by other cores (e.g., core2, core8). With these identifiers available, logic for accessing the DSM may index into the DSM (e.g., row t4 (core4), column t2, column t8) and increment counter values. These counter values capture sharing behavior among the threads.

The captured information may then be made available to a higher level system (e.g., operating system, thread scheduler) so that decisions concerning thread scheduling can be made based on the thread sharing behavior. In one example, the captured information may be exposed in a special purpose memory mapped I/O (input/output) region. Thus, instructions accessing the memory region associated with exposing the information will be decoded and directed to the degree of sharing data structure.

Apparatus 100 may be embodied, for example, as a portion of a computing system having thread control. For example, a computing system may include a memory to store a thread control instruction and a processor to execute the thread control instruction. The processor may be coupled to the memory and may include a first unit to dynamically determine a cache sharing behavior between threads in a multi-threaded computing system having multiple cores. The processor may also include a second unit to dynamically control the composition of a set of threads in the multi-threaded computing system. The control may be based, for example, on the sharing behavior between threads. The thread control instruction controls the operation of the first unit and the second unit.

"Logic", as used herein, includes but is not limited to hardware, firmware, software and/or combinations thereof to perform a function(s) or an action(s), and/or to cause a function or action from another logic, method, and/or system. Logic may include discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on.

"Signal", as used herein, includes but is not limited to, electrical signals, optical signals, analog signals, digital signals, or other means that can be received, transmitted and/or detected.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
a first unit to dynamically determine a cache sharing behavior between threads in a multi-threaded computing system; and
a second unit to dynamically control the composition of a set of threads in the multi-threaded computing system based, at least in part, on the sharing behavior between threads;
a state logic to store data corresponding to a state in a finite state machine (FSM) and to control transitions between states in the FSM based on the cache sharing behavior between the threads, the state logic to control the first unit and the second unit;
the first unit comprising:
    a detection logic to detect an inter-thread cache conflict condition between two or more threads in the multi-threaded computing system; and
    a classification logic to classify a thread as one of, a quiet thread, a non-quiet thread, a victim thread, a hybrid thread, and a bully thread, based on thread-to-thread affinity as determined by relative interdependent cache metrics, and the second unit comprising:
    a confinement logic to limit availability of cache space in the multi-threaded system to a bully thread;
the FSM having four states, the four states being:
    an initial state where threads are run for a warm-up period, where miss rate counters are then reset, where threads are then run for a sample period, and where threads are classified as quiet or non-quiet based on miss metrics generated during the sample period;
    a classification state where accesses from non-quiet threads are isolated, where exclusive way partitioning among non-quiet threads is performed, where threads are then run for a test period, and where threads are then classified based on a change in miss metrics;
    a confinement state where cache space availability is limited for a bully thread, where a number of ways to allocate to a bully thread is determined, and where the number of ways is allocated to the bully thread to stabilize the bully thread; and
    a stable state that is to be held until one or more of a pre-determined number of cycles are executed in the multi-threaded computing system and a change in the composition of the set of threads.

2. The apparatus of claim 1, where the classification logic is to classify a thread based on a vulnerability attribute and a destructiveness attribute, where the vulnerability attribute describes the likelihood of a thread experiencing cache misses when sharing the cache with other threads that the thread would not have experienced if not sharing the cache, and where the destructiveness attribute describes the ability of a thread to evict lines from a cache.

3. The apparatus of claim 2,
- a quiet thread being a non-vulnerable, non-destructive thread that is unlikely to experience cache misses due to inter-thread conflicts;
- a victim thread being a vulnerable, non-destructive thread that is likely to experience cache misses due to inter-thread conflicts;
- a hybrid thread being a vulnerable, destructive thread that may behave as a victim or a bully thread, depending on the type of threads with which it shares a cache; and
- a bully thread being a non-vulnerable, destructive thread that is likely to cause cache misses in other threads.

4. The apparatus of claim 1, where the classification logic is to classify a thread based on differences between cache metrics associated with a thread while the partition mask for the thread is in a first state, and a cache metric associated with the thread while the partition mask for the thread is in a second state.

5. The apparatus of claim 1,
- where a transition from the initial state to the classification state occurs upon identification of at least two non-quiet threads in a set of threads running on the multi-threaded computing system;
- where a transition from the initial state to the stable state occurs upon identification of less than two non-quiet threads in the set of threads running on the multi-threaded computing system;
- where a transition from the classification state to the confinement state occurs upon identification of a bully thread;
- where a transition from the confinement state to the stable state occurs upon stabilization of a bully thread;
- where a transition from the classification state to the stable state occurs upon a determination that there are no bully threads; and
- where a transition from the stable state to the initial state occurs upon identification of one or more of, a change in the composition of the set of threads, and completion of a pre-determined number of cycles.

6. The apparatus of claim 5, comprising:
- a register to store a miss metric generated while the finite state machine is in the initial state;
- a data store to store data corresponding to an indicator that identifies whether a thread is a quiet thread;
- a register to store data corresponding to a miss metric threshold against which a miss metric can be compared to determine whether a thread is a quiet thread;
- a set of registers to store data corresponding to the miss metrics generated while the finite state machine is in the multi-pass classification state;
- a data store to store data corresponding to an indicator that identifies whether a thread is a bully thread;
- a register to store data corresponding to a change in miss metric threshold against which a change in miss metric can be compared to determine whether a thread having the change in miss metric is a victim thread, a hybrid thread, or a bully thread;
- a set of registers to store data corresponding to the miss metrics generated while the finite state machine is in the multi-pass confinement state;
- a data store to store data corresponding to an indicator that identifies whether a thread has been stabilized while the finite state machine is in the confinement state; and
- a register to store data corresponding to a confinement difference threshold against which a miss metric can be compared to determine whether a bully thread has been stabilized.

* * * * *